United States Patent [19]
Yazaki

[11] 3,861,661
[45] Jan. 21, 1975

[54] COMPRESSION SPRING ASSEMBLY

[75] Inventor: Komei Yazaki, Yokosuka, Japan

[73] Assignee: Nissan Motors Co., Yokohama City, Japan

[22] Filed: Sept. 12, 1973

[21] Appl. No.: 396,369

[30] Foreign Application Priority Data
Sept. 21, 1972 Japan.............................. 47-110729

[52] U.S. Cl. ................................ 267/33, 267/9 B
[51] Int. Cl. ........................................ B60g 11/52
[58] Field of Search ............... 267/9 B, 9 R, 615, 33

[56] References Cited
UNITED STATES PATENTS
| | | | |
|---|---|---|---|
| 1,832,184 | 11/1931 | Christen | 267/33 |
| 1,936,389 | 11/1933 | Hallquist | 267/33 |
| 1,952,102 | 3/1934 | Sproul | 267/9 B |
| 3,141,660 | 7/1964 | Clarke et al. | 267/615 |

*Primary Examiner*—James B. Marbert

[57] ABSTRACT

A resilient member press-fitted in a compression spring assembly for use in a suspension system of a vehicle. The resilient member has a rigid tube imbedded therein and bumper portions formed at both ends thereof in such a manner that the total length of the resilient member is longer than the length of the compression spring at its compression limit.

4 Claims, 3 Drawing Figures

PATENTED JAN 21 1975  3,861,661

COMPRESSION SPRING ASSEMBLY

This invention relates to a compression spring assembly for a suspension system of a vehicle such as an automobile.

Great efforts are now being made in industrial circles to reduce the noise levels inside vehicles such as automobiles during operation. As is well known, one of the factors which causes noise inside a vehicle is vibration transmitted from the suspension system to the body of the vehicle. In some vehicles, this vibration is one of the greatest causes of noise. More particularly, a compression spring which is one element of the suspension system of a vehicle vibrates in response to forces transmitted from the engine, etc., and in turn transmits vibrations to the body of the vehicle thereby creating noise inside the vehicle. Accordingly, reduction and attenuation of compression spring vibration are considered effective for reducing noise in a vehicle.

It is, therefore, an object of the present invention to provide a compression spring assembly for use in a suspension system of a vehicle which can attenuate or reduce vibrations imparted thereto to reduce the noise level inside a vehicle.

It is another object of the present invention to provide a compression spring assembly for use in a suspension system of a vehicle which absorbs shocks imparted thereto when the compression spring reaches its compression limit.

In accordance with the present invention, there is provided a compression spring having a resilient member press-fitted therein which has a rigid tube such as a steel tube imbedded in the resilient member, and bumper portions formed at both ends thereof in such a manner that the total length of the resilient member is longer than the length of the compression spring at its compression limit.

These and other objects and features of the present invention will become more fully apparent from the following description taken in conjunction with the accompanying drawings, in which.

Figure 1:
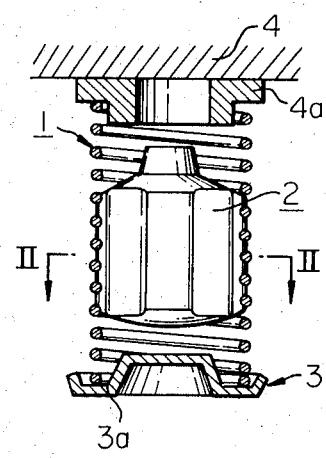
FIG. 1 is a longitudinal sectional view of one embodiment of a compression spring assembly according to the present invention.
Figure 2:
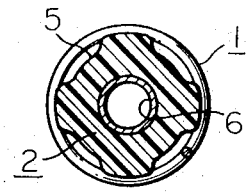
FIG. 2 is a lateral sectional view of the compression spring assembly taken along a line II—II in FIG. 1.

Referring now to FIGS. 1 and 2, which show one embodiment of a compression spring assembly of the invention, there is shown a compression spring 1 for use in a suspension system of a vehicle (not shown). A resilient member 2 is press-fitted inside the compression spring 1.

This compression spring is usually supported at the lower end thereof in a seat 3a of an arm 3 connected to a suspension member (not shown) of the vehicle and is also supported at the upper end thereof in a seat 4a connected to a body 4 of the vehicle.

Figure 3:
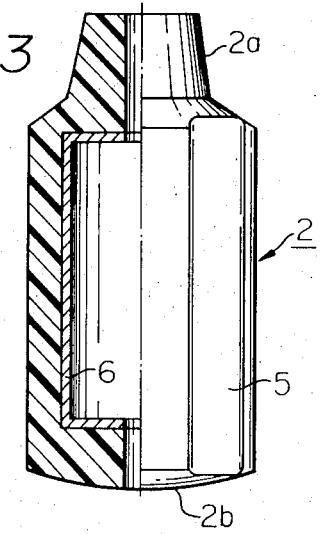
FIG. 3 is a side view partly in section of a resilient member for use in a compression spring assembly according to the present invention.

The resilient member 2, as shown in FIG. 3, is made of a resilient material, for example, natural rubber, styren butadien rubber or butyl rubber, and is in the form of a cylinder or a tube which has an outside diameter larger than the inside diameter of the compression spring 1. This member 2 is pressfitted inside the compression spring 1 and is held therein by frictional resistance at its outer periphery. Thus the member 2, by frictional resistance at its outer periphery, acts to attenuate vibration of the compression spring 1, and enhances the dampening effect.

The resilient member 2 may further have a plurality of axial grooves 5 formed on the outer periphery thereof. In this way, the spring constant of the spring assembly can be desirably selected, and water, dust, pebbles, etc., can escape through the grooves 5.

Usually, a compression spring of this type is equipped with bumper rubber portions or resilient stopper portions for preventing shockes from being transmitted to the vehicle when the compression limit of the compression spring is reached. To achieve this same purpose, a compression spring assembly according to this invention may have bumper portions 2a and 2b formed at the top and bottom, respectively, of the resilient member 2. In this case, the resilient member 2 has a rigid tube 6 such as a steel tube imbedded therein for preventing the resilient member 2 from buckling. The size of this rigid tube 6 is selected so that the rigid tube 6 will not impair the resiliency of the resilient member 2. The total length of the resilient member 2 equipped with bumper portions 2a and 2b is preferably longer than that of the compression spring 1 at its compression limit or than the solid height of the compression spring 1.

It is understood from the foregoing description that since a compression spring assembly used in a suspension system of a vehicle according to this invention has a resilient member press-fitted inside a compression spring, vibration created by the engine, etc. is attenuated by the resilient member press-fitted inside the compression spring thereby preventing the vibration from being transmitted to the body of the vehicle, and therefore the noise level inside the vehicle is remarkably reduced. Also, since a spring assembly according to this invention comprises only a resilient member press-fitted inside a compression spring, it is very simple in construction and is therefore easily adapted to conventional vehicles, and since the resilient member does not project from the compression spring, it does not interfere with the functioning of other components.

What is claimed is:

1. A compression spring assembly for a suspension system of a vehicle comprising a compression spring and a substantially cylindrical resilient member press-fitted therein, wherein said resilient member has a rigid tube imbedded therein and bumper portions formed at both ends thereof in such a manner that the total length of said resilient member is longer than the length of said compression spring at its compression limit.

2. A compression spring assembly according to claim 1, wherein said resilient member has an outer diameter larger than the inside diameter of said compression spring.

3. A compression spring assembly according to claim 1, wherein said resilient member has a plurality of axial grooves formed on the outer periphery thereof.

4. A compression spring assembly according to claim 1, wherein said resilient member is made of a material selected from the group consisting of natural rubber, styren butadien rubber and buthyl rubber.

* * * * *